April 29, 1952      N. AHLMANN      2,595,117
METHOD AND APPARATUS FOR GRINDING
Filed March 6, 1951
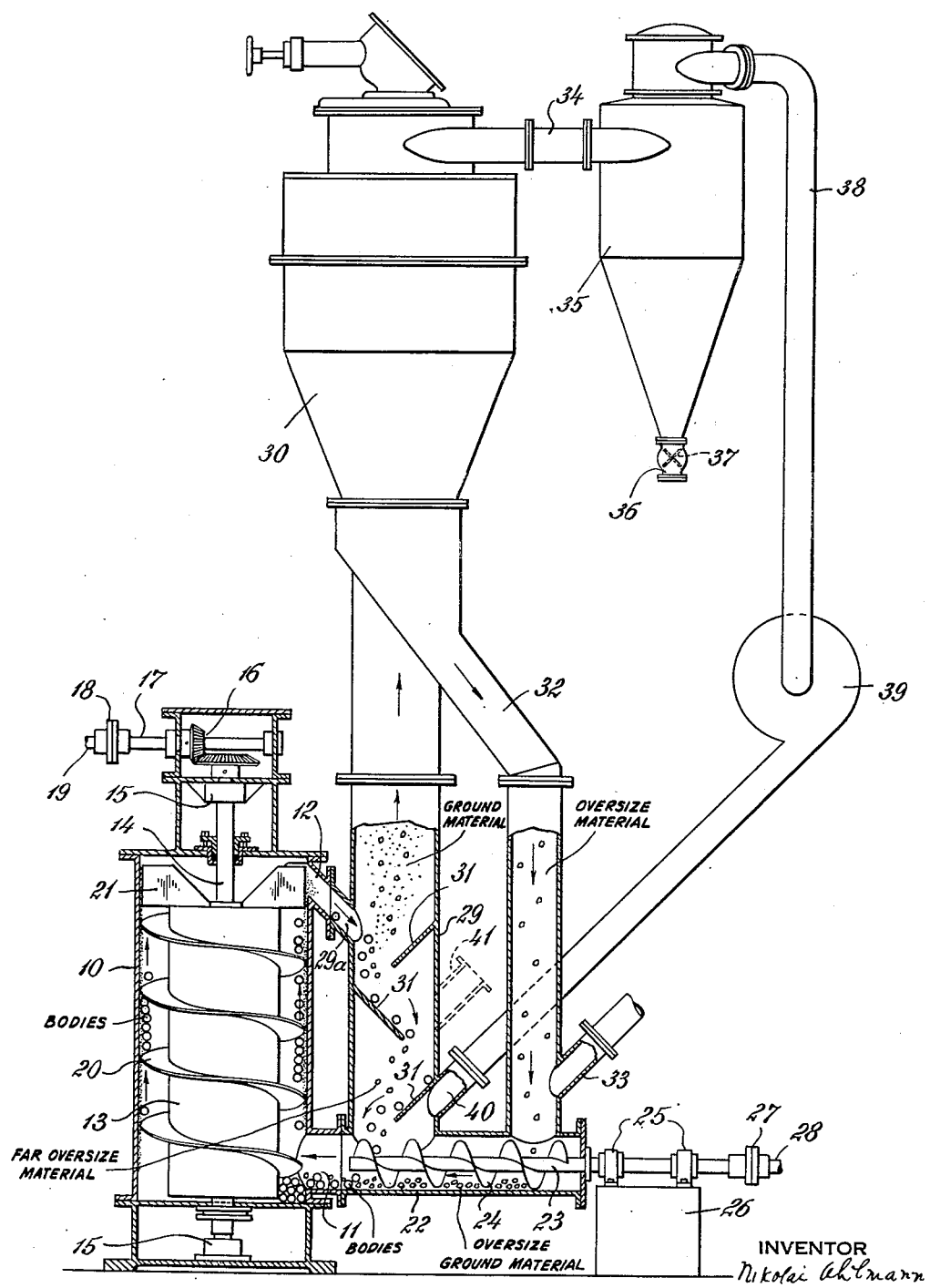
INVENTOR
Nikolai Ahlmann
BY
Pennie Edmonds Morton Barrows Taylor
ATTORNEYS Patented Apr. 29, 1952

2,595,117

UNITED STATES PATENT OFFICE 2,595,117

METHOD AND APPARATUS FOR GRINDING

Nikolai Ahlmann, Copenhagen, Denmark, assignor to F. L. Smidth & Co., New York, N. Y., a corporation of New Jersey Application March 6, 1951, Serial No. 214,033
In Great Britain, March 8, 1950

7 Claims. (Cl. 241—19)

1

This invention relates to the grinding of material by the use of freely movable grinding bodies and is concerned more particularly with a novel method and apparatus for grinding by means of small grinding bodies, which perform their grinding action by reason of being subjected to centrifugal force.

In my co-pending application, Ser. No. 758,768, filed July 3, 1947, I have disclosed a method of grinding material by means of small grinding bodies and different forms of apparatus, by which the method can be practiced. According to the method, the material to be ground and a charge of small grinding bodies are introduced into a vessel of circular cross-section containing an agitator having a plurality of blades. Either the vessel or the agitator is then rotated at high speed on the axis of the vessel and this causes the material and grinding bodies to be subjected to centrifugal force and to accumulate in a layer covering the entire inner surface of the vessel. The layer is continuously agitated and advanced along the wall of the vessel, so that the bodies perform their grinding action, and, at the end of the vessel, toward which the layer is advanced, the sufficiently ground material or fines may be withdrawn and the grinding bodies returned with the insufficiently ground material to the other end of the vessel through the interior of the latter. As an alternative, the grinding bodies and all the material arriving at the discharge end of the vessel may be withdrawn, after which the grinding bodies and insufficiently ground or coarse material may be separated from the fines and returned to the inlet end of the vessel. As the operation proceeds, fresh material is introduced into the vessel at the inlet end.

The present invention is directed to the provision of a method of grinding by means of small grinding bodies, which is an improvement on that of the co-pending application in various respects. Thus, in the new method, the grinding bodies and all the material arriving at the discharge end of the container are removed and the grinding bodies are at once separated from the mixture and returned to the container at the inlet end thereof. Substantially all of the material is then conveyed to a separator, where the fines and coarse are separated, the coarse being conducted to the container inlet and the fines collected. The separation of the grinding bodies from the mixture of bodies and material is effected by discharging the mixture into an upwardly flowing current of air, which entrains the material and through which the bodies fall. The fresh material may then be delivered into the air current, so that fines in the material will be removed and not be subjected to grinding. The coarse fraction of the fresh material falls through the air current and is collected with the grinding bodies and introduced

2 with them and with the coarse fraction from the separator into the container at its inlet end.

For a better understanding of the invention, reference may be made to the accompanying drawing, in which the single figure is a view, partly in elevation and partly in vertical section, of one form of apparatus for the practice of the new method.

The grinding apparatus illustrated comprises a container 10 of cylindrical form mounted with its axis vertical and having an inlet 11 near its lower end and an outlet 12 near its upper end. Within the container, a cylinder 13 is mounted on a vertical shaft 14 rotating in upper and lower bearings 15. The shaft is driven through bevel gearing 16 by a shaft 17 connected by a coupling 18 to a drive shaft 19. A helical vane 20 is mounted on the outer surface of the cylinder 13 and extends close to the inner wall of the container. At its upper end, the cylinder carries radial blades 21 lying opposite the outlet 12.

A casing 22 is connected to inlet 11 and contains a shaft 23 carrying screw flights 24. The shaft is mounted in bearings 25 supported outside the casing on a block 26 and the shaft is connected by a coupling 27 to a drive shaft 28.

A vertical air duct 29 is connected at its lower end to the top of casing 22 adjacent its connection to inlet 11 and extends upwardly to a separator 30. The outlet 12 from the container is connected by a branch 29a to duct 29 and the outlet and branch extend downwardly at an angle to the vertical. A plurality of inclined plates 31 are mounted on the inner wall of the duct and extend alternately from opposite sides thereof below the connection of branch 29a to the duct.

A pipe 32 leads from the lower end of separator 30 to the interior of casing 22 outwardly from duct 29 and an inlet 33 for fresh material leads into pipe 32 a short distance above its connection to casing 22.

A pipe 34 connects the top section of separator 30 to a cyclone separator 35 having a bottom discharge outlet 36 containing a star valve 37. From the top section of separator 35, a line 38 leads to an intake of a fan 39, the outlet of which is connected to a branch 40 leading upwardly from duct 29a a short distance above its connection to casing 22. If desired, the fresh material may be introduced into the apparatus through an inlet 41 leading to the interior of duct 29 above one or more of the inclined plates 31.

In the operation of the apparatus in the practice of the method, the grinding bodies employed are relatively small. For example, in grinding a material initially reduced to a maximum particle size of from 0.5 mm. to 1 mm. to produce a finished product, of which 15% has a particle size less than 2 microns, the grinding bodies may be made of an iron alloy and have the form of pellets of a diameter from 1 mm. to 4 mm. A charge of the grinding bodies, together with material to be ground, is introduced into casing 22 through either inlet 33 or inlet 41, and the material and grinding bodies are then passed into container 10 through container inlet 11 by the flight 24 on shaft 23. The cylinder 13 is driven at a high speed as, for example, at 200 R. P. M., if the container is about 4 ft. in diameter. The material and grinding bodies are formed into a layer over the entire inner surface of the container by the action of vane 20 and by centrifugal force, and the layer is advanced upwardly along the container wall toward the outlet. At the same time, the constituents of the layer are continuously agitated by the action of the vane with the result that the grinding bodies function by centrifugal action to grind the material.

When the top of the layer reaches the upper end of the cylinder, the grinding bodies and material are discharged through outlet 12 by the action of blades 21 and this discharge action continues throughout the operation. The bodies and material fall downwardly through branch 29a into duct 29.

The fan 39 continuously causes an upward flow of air through duct 29 and the speed of the fan is adjusted, so that the grinding bodies entering duct 29 will fall through the duct while substantially all of the material is carried upwardly through the duct to separator 30. As the grinding bodies travel down through the duct, they strike the inclined plates 31, bouncing from one plate to the next, and this causes fine material adhering to the bodies to be shaken free and carried upwardly by the air stream. The grinding bodies, together with any material too heavy to be entrained by the air stream, drop down into casing 22 and are then introduced again into the container through the inlet.

The material carried upwardly through duct 29 in the air stream enters separator 30, where a coarse fraction is separated out and passes through pipe 32 to casing 22 to be returned to the container through its inlet 11. The fines remaining in the air stream are carried out of separator 30 through pipe 34 into separator 35, where the fines are collected for discharge through outlet 36. Air leaving the separator is returned through pipe 38 to the intake of the fan 39, so that the air is circulated through a closed path.

As the grinding operation proceeds and the grinding bodies gradually wear away, fresh bodies can be introduced with the fresh material through inlet 33 or inlet 41. It is advantageous to employ inlet 41 instead of inlet 33, since, when fresh material is introduced through inlet 41 into duct 29, it falls through the air stream flowing upward through duct 29 and any sufficiently fine particles are thereby separated from the fresh material and carried off without ever being subjected to grinding. While most of the material discharged from the container into duct 29 is entrained in the air stream, very coarse particles, which cannot be entrained, will fall through the duct to enter casing 22 to be returned to the container.

By connecting the air outlet of separator 35 to the intake of fan 39 and thus causing the air to travel through a closed circuit, fresh air need not be added. This is advantageous, since the moisture content in the fresh air may adversely effect the very fine particles produced by grinding.

While I have described the practice of the method in connection with the apparatus disclosed, which includes the container mounted on a vertical axis, the method may be practiced in a tube mill provided with agitating means and rotated at such speed that the grinding is not produced by cascading but by centrifugal action. In a tube mill, the grinding bodies used are somewhat larger than those described above and preferably have a diameter from 5 to 10 mm. With such bodies, materials of a particle size up to 2 mm. may be ground successfully in a tube mill.

I claim:

1. In a method of grinding material, in which the grinding is performed within a cylindrical vessel mounted with its axis vertical by small grinding bodies acting on the material by centrifugal action, the steps of advancing the material and grinding bodies upwardly along the wall of the vessel toward the upper end thereof and simultaneously subjecting the material and grinding bodies to centrifugal action, continuously withdrawing a mixture of the grinding bodies and material at the upper end of the vessel, maintaining an air stream having an upwardly flowing portion, directing the mixture of material and grinding bodies withdrawn from the vessel into said portion of the stream, the grinding bodies and far over-size material falling out of the stream and the ground and partially ground material being entrained in the stream, returning the grinding bodies and far over-size material into the vessel at the lower end thereof, separating the entrained material into fine and over-size fractions, introducing the over-size fraction into the vessel at the lower end thereof, and introducing fresh material into the vessel at the lower end thereof.

2. In a method of grinding material, in which the grinding is performed within a vessel by small grinding bodies acting on the material by centrifugal action, as the material and bodies move along the wall of the vessel toward one end thereof, the steps of continuously discharging a mixture of the grinding bodies and material at said end of the vessel, maintaining an air stream having an upwardly flowing portion, directing the mixture into said portion of the stream, the grinding bodies falling out of the stream and the ground and partially ground material being entrained in the stream, collecting the fallen grinding bodies and introducing them into the vessel at the other end thereof, separating an over-size fraction from the material entrained in the stream, introducing the over-size fraction into the vessel at said other end thereof, and introducing fresh material into the vessel at said other end thereof.

3. In a method of grinding material, in which the grinding is performed within a cylindrical vessel mounted with its axis vertical by small grinding bodies acting on the material by centrifugal action, the steps of advancing the material and grinding bodies upwardly along the wall of the vessel toward the upper end thereof and simultaneously subjecting the material and grinding bodies to centrifugal action, continuously withdrawing a mixture of the grinding bodies and material at the upper end of the vessel, maintaining an air stream having an upwardly flowing portion, directing the mixture of material and grinding bodies withdrawn from the vessel into said portion of the stream, the grinding bodies and far over-size material falling out of the stream and the ground and partially ground material being entrained in the stream, returning the grinding bodies and far over-size material into the vessel at the lower end thereof, separating the entrained material into fine and over-size fractions, introducing the over-size fraction into the vessel at the lower end thereof, collecting the grinding bodies and far over-size material, which have fallen out of the air stream, adjacent the lower end of the vessel, adding fresh material to the collected grinding bodies and far over-size material, and introducing the mixture of grinding bodies and fresh and far over-size material into the vessel at the lower end thereof.

4. In a method of grinding material, in which the grinding is performed within a vessel by small grinding bodies acting on the material by centrifugal action, as the material and bodies move along the wall of the vessel toward one end thereof, the steps of continuously discharging a mixture of the grinding bodies and material at said end of the vessel, maintaining an air stream traveling through a closed circuit and having an upwardly flowing portion, directing the mixture into said portion of the stream, the grinding bodies falling out of the stream and the ground and partially ground material being entrained in the stream, separating an over-size fraction from the material entrained in the stream, introducing the over-size fraction into the vessel at the other end thereof, introducing fresh material into said portion of the stream, the over-size particles in the material falling out of the stream and the remainder being entrained in the stream, and collecting the fallen grinding bodies and over-size particles and introducing them into the vessel at said other end thereof.

5. Apparatus for grinding material, which comprises a container for material and a charge of small grinding bodies, the container having an inlet near its lower end and an outlet near its upper end, rotary means within the container for advancing the material and grinding bodies in a thin layer covering the entire inner surface of the container from the inlet to the outlet, said means agitating the layer continuously and discharging the material and bodies through the outlet, a vertical duct connected to the container inlet and outlet, means for causing a stream of air to flow upwardly through the duct, the bodies and insufficiently ground material discharged through the outlet falling through the air stream in the duct and the remainder of the material being entrained in the air stream, a separator connected to the upper end of the duct and operating to remove a coarse fraction from the material entering the separator in the air stream, a casing connected to the container inlet and to the lower end of the duct and receiving grinding bodies and insufficiently ground material from the duct, means for directing the coarse fraction from the separator into the casing, means for introducing fresh material into the casing, and means within the casing for advancing the contents thereof into the container through the inlet.

6. Apparatus for grinding material, which comprises a container for material and a charge of small grinding bodies, the container having an inlet near its lower end and an outlet near its upper end, rotary means within the container for advancing the material and grinding bodies in a thin layer covering the entire inner surface of the container from the inlet to the outlet, said means agitating the layer continuously and discharging the material and bodies through the outlet, a vertical duct connected to the container inlet and outlet, means for causing a stream of air to flow upwardly through the duct, the bodies and insufficiently ground material discharged through the outlet falling through the air stream in the duct and the remainder of the material being entrained in the air stream, a separator connected to the upper end of the duct and operating to remove a coarse fraction from the material entering the separator in the air stream, a casing connected to the container inlet and to the lower end of the duct and receiving grinding bodies and insufficiently ground material from the duct, means for directing the coarse fraction from the separator into the casing, means for introducing fresh material into the duct above the lower end thereof, the sufficiently fine particles of the material being entrained in the air stream and the remainder falling through the duct into the casing, and means within the casing for advancing the contents thereof through the inlet into the container.

7. Apparatus for grinding material, which comprises a container for material and a charge of small grinding bodies, the container having an inlet near its lower end and an outlet near its upper end, rotary means within the container for advancing the material and grinding bodies in a thin layer covering the entire inner surface of the container from the inlet to the outlet, said means agitating the layer continuously and discharging the material and bodies through the outlet, a vertical duct connected to the container inlet and outlet, a fan having its outlet connected to the duct near the lower end thereof, the fan causing a stream of air to flow upwardly through the duct, the bodies and insufficiently ground material discharged through the outlet falling through the air stream in the duct and the remainder of the material being entrained in the stream, a separator connected to the upper end of the duct and operating to remove a coarse fraction from the material entering the separator in the air stream, a second separator connected to the first to receive a flow of air and fine particles therefrom, the second separator removing the fine particles, a connection for leading the air from the second separator to the inlet of the fan, a casing connected to the container inlet and to the lower end of the duct and receiving grinding bodies and insufficiently ground material from the duct, means for directing the coarse fraction from the first separator into the casing, means for introducing fresh material into the casing, and means within the casing for advancing the contents thereof into the container through the inlet.

NIKOLAI AHLMANN.

REFERENCES CITED

The following references are of record in the file of this patent:

UNITED STATES PATENTS

| Number | Name | Date |
|---|---|---|
| 2,012,694 | Runyan | Aug. 27, 1935 |
| 2,332,701 | Dowsett | Oct. 26, 1943 |
| 2,375,552 | Herbert | May 8, 1945 |

FOREIGN PATENTS

| Number | Country | Date |
|---|---|---|
| 163,701 | Germany | Oct. 14, 1905 |
| 192,240 | Germany | Nov. 25, 1907 |
| 142,176 | Great Britain | Jan. 17, 1919 |
| 615,652 | Great Britain | Jan. 10, 1949 |